(12) United States Patent
Kosugi et al.

(10) Patent No.: US 6,759,130 B2  
(45) Date of Patent: Jul. 6, 2004

(54) RESIN COMPOSITION, MOLDED PRODUCT THEREOF AND ELECTROCONDUCTIVE SHEET

(75) Inventors: Kazuhiro Kosugi, Gunma (JP); Takeshi Miyakawa, Gunma (JP); Masanori Higano, Gunma (JP); Mikio Shimizu, Gunma (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 73 days.

(21) Appl. No.: 10/235,631

(22) Filed: Sep. 6, 2002

(65) Prior Publication Data

US 2003/0049452 A1 Mar. 13, 2003

Related U.S. Application Data

(62) Division of application No. 09/926,775, filed as application No. PCT/JP00/07516 on Oct. 26, 2000, now Pat. No. 6,485,832.

(30) Foreign Application Priority Data

| Oct. 27, 1999 | (JP) | 11-304883 |
| Mar. 8, 2000 | (JP) | 2000-63050 |
| Aug. 25, 2000 | (JP) | 2000-254786 |
| Aug. 31, 2000 | (JP) | 2000-262224 |
| Sep. 4, 2000 | (JP) | 2000-266446 |

(51) Int. Cl.$^7$ ............. B32B 9/00; B32B 27/36  
(52) U.S. Cl. .......... 428/412; 428/253; 428/284; 428/286; 428/408; 428/902; 428/246  
(58) Field of Search ............... 428/246, 253, 428/284, 286, 408, 902, 412

(56) References Cited

U.S. PATENT DOCUMENTS

| 4,599,262 A | 7/1986 | Schulte et al. |
| 4,929,496 A * | 5/1990 | Daimon et al. ............. 442/187 |

FOREIGN PATENT DOCUMENTS

| EP | 0 435 044 | 7/1991 |
| JP | 60-124247 | 7/1985 |
| JP | 3-1940 | 1/1991 |
| JP | 5-147147 | 6/1993 |
| JP | 7-21834 | 1/1995 |
| JP | 07-021834 | 1/1995 |
| JP | 8-132567 | 5/1996 |
| JP | 8-295001 | 11/1996 |
| JP | 9-53008 | 2/1997 |
| JP | 10-329279 | 12/1998 |
| JP | 11-10806 | 1/1999 |
| JP | 11-42739 | 2/1999 |

* cited by examiner

Primary Examiner—Terressa M. Boykin  
(74) Attorney, Agent, or Firm—Oblon, Spivak, McClelland, Maier & Neustadt, P.C.

(57) ABSTRACT

An electroconductive sheet comprising a substrate layer of a thermoplastic resin comprising an acrylonitrile-butadiene-styrene copolymer type resin and/or a polystyrene type resin and having laminated on at least one side of the substrate layer, a surface layer of an electroconductive resin composition comprising a polycarbonate type resin and from 5 to 50 wt % of carbon black.

24 Claims, No Drawings

RESIN COMPOSITION, MOLDED PRODUCT THEREOF AND ELECTROCONDUCTIVE SHEET

This application is a Divisional Application of application Ser. No. 09/926,775 filed on Dec. 18, 2001, now U.S. Pat. No. 6,485,832 Issued Nov. 26, 2002, which is the National Stage of International Application No. PCT/JP/07516 filed Oct. 26, 2000.

TECHNICAL FIELD

The present invention relates to a resin composition, a molded product employing it and an electroconductive sheet. Said electroconductive sheet is useful for packaging containers for semiconductors such as IC and electronic parts, particularly useful for carrier tapes.

BACKGROUND ART

For packaging IC, electronic parts using IC or electronic parts, injection-molded trays, vacuum-formed trays, magazines, carrier tapes (referred to also as embossed carrier tapes) etc. have been used. To prevent breakage of electronic parts such as IC due to static electricity, as the packaging containers, ones having an electroconductive filler dispersed therein have been used. As the electroconductive filler, carbon black is widely used, with which a stable surface resistivity will be obtained constantly at a low cost.

An electroconductive sheet comprising a thermoplastic resin having carbon black dispersed therein, has such drawbacks that (1) mechanical strength and processability will decrease, and (2) an electronic part will be stained by falling off of the resin containing carbon black on the surface of the electroconductive sheet by abrasion of the packaged electronic part with the electroconductive sheet. JP-A-57-205145, JP-A-62-18261, etc. have been proposed as a method to overcome the problem (1), and JP-A-9-7624, JP-A-9-76425, etc. have been proposed as a method to overcome the problem (2). However, electronic parts are getting more complex, precise and small, and packaging and mounting of electronic parts proceed at a higher speed at the present time, and accordingly, an electroconductive sheet for packaging an electronic part, which is less likely to cause staining of the electronic part, and which has improved mechanical strength, has been desired.

DISCLOSURE OF THE INVENTION

The present invention provides an electroconductive sheet for packaging an electronic part, which substantially reduces staining of the electronic part due to abrasion of the electroconductive sheet with the electronic part, and which has adequate mechanical strength to endure packaging or mounting at a high speed, and a packaging container for an electronic part. The electroconductive sheet is particularly useful for a carrier tape.

The present invention provides an electroconductive sheet comprising a substrate layer and having laminated on at least one side of the substrate layer, a surface layer of an electroconductive resin composition comprising a polycarbonate type resin and from 5 to 50 wt % of carbon black based on the polycarbonate type resin. Said electroconductive sheet is useful as an electroconductive sheet for packaging an electronic part, and said electroconductive sheet for packaging an electronic part is useful as a packaging container for an electronic part, particularly as a carrier tape.

As a constitution of the electroconductive sheet, a two-layer structure of surface layer/substrate layer, wherein the surface layer comprises an electroconductive resin composition and is placed on the side which will be in contact with the electronic part, is preferred. Further, a constitution of surface layer/substrate layer/surface layer is also preferred. Another layer may be provided between the surface layer and the substrate layer.

The polycarbonate type resin for the electroconductive resin composition is not particularly limited, and an commercially available product may be used. For example, an aromatic polycarbonate resin, an aliphatic polycarbonate resin and an aromatic-aliphatic polycarbonate may be mentioned. One obtained by polycondensation of a conventional bisphenol A with phosgene or by polycondensation of bisphenol A with carbonic acid ester, which is usually classified into an engineering plastic, may also be used. This is composed mainly of bisphenol, and produced by a phosgene method or by ester exchange, and the bisphenol to be used as the raw material may, for example, be 2,2-bis-(4-hydroxyphenyl)propane (bisphenol A), 2,4-bis-(4-hydroxyphenyl)-methyl-butane or 1,1-bis-(4-hydroxyphenyl)-cyclohexane. A homopolycarbonate, a copolycarbonate obtained by copolymerization of a carboxylic acid, or a mixture thereof, may also be used.

Carbon black to be incorporated in the electroconductive resin composition may, for example, be furnace black, channel black or acetylene black, and preferred is one having a large specific surface area and whereby a high level of electroconductivity can be obtained with a small amount of incorporation to the resin, such as KETJENBLACK or acetylene black.

The amount of carbon black to be incorporated in the electroconductive resin composition is preferably from 5 to 50 wt % based on the polycarbonate type resin. If it is less than 5 wt %, no adequate surface resistivity will be obtained to prevent breakage of an electronic part due to static electricity. If it exceeds 50 wt %, the fluidity will decrease, whereby it may be difficult to laminate the electroconductive resin composition on the substrate layer, and the mechanical strength of the electroconductive sheet to be obtained will also decrease.

The surface resistivity of the electroconductive sheet on the side on which the electroconductive resin composition is laminated, is preferably from $10^2$ to $10^{10}$ $\Omega$. If it is beyond this range, it tends to be difficult to prevent breakage of an electronic part due to static electricity.

Into the electroconductive resin composition, another resin component such as an acrylonitrile-butadiene-styrene copolymer type resin or a polybutylene terephthalate resin may be incorporated as a modifier.

As the modifier, a graft resin of an ethylene-glycidylmethacrylate type copolymer with an acrylonitrile-styrene type copolymer is suitably used. The electroconductive resin composition in this case comprises a polycarbonate type resin, and from 5 to 50 wt % of carbon black and at most 40 wt % of a graft resin of an ethylene-glycidylmethacrylate type copolymer with an acrylonitrile-styrene type copolymer, based on the polycarbonate type resin. The electroconductive resin composition may be made of a polycarbonate type resin, carbon black and a graft resin alone, or may be composed mainly of those and contain another component within a range of not impairing the purpose of the present invention.

The graft resin of an ethylene-glycidylmethacrylate type copolymer with an acrylonitrile-styrene type copolymer is a resin obtained by grafting an acrylonitrile-styrene type copolymer to an ethylene-glycidylmethacrylate type copolymer, and a resin obtained by grafting an acrylonitrile-styrene type copolymer having an acrylonitrile content of at most 50 wt % to an ethylene-glycidylmethacrylate type copolymer having a glycidylmethacrylate content of at most 45 wt %, is suitably used, which is commercially available.

The amount of the graft resin to be incorporated is at most 40 wt %, preferably from 1 to 40 wt %, more preferably from 3 to 40 wt %, based on the polycarbonate type resin. Within the above range, the mechanical strength, particularly impact strength, will be improved to endure packaging and mounting of electronic parts at a high speed. If it exceeds 40 wt %, the elastic modulus will decrease.

When the above resin composition is used for an electroconductive sheet as an electroconductive resin composition, it may be used as a monolayer electroconductive sheet or a multilayer electroconductive sheet. It may be used as a molded product by itself.

Into the electroconductive resin composition, an additive such as a lubricant, a plasticizer or a processing aid may further be incorporated as the case requires.

The electroconductive sheet is particularly useful as a carrier tape. For such an application, an electroconductive sheet for a carrier tape, which has a reduced reflection on the surface, has been desired so as to prevent malfunction of an inspection machine due to reflection on the surface of the electroconductive sheet at the time of image inspection of e.g. IC. According to the present invention, the layer of an electroconductive resin composition has a surface roughness Ra of from 0.6 μm to 4.0 μm, whereby malfunction of an inspection machine due to reflection on the electroconductive sheet surface can be prevented at the image inspection of electronic parts such as IC. If the surface roughness Ra is less than 0.6 μm, the surface gloss tends to be high, whereby the machine will malfunction due to reflection on the electroconductive sheet surface at the image inspection, and if it exceeds 4.0 μm, the surface of the electroconductive sheet tends to be too rough, and the appearance of the sheet tends to be poor, and the sheet is thereby not suitable as an electroconductive sheet for a carrier tape. Here, the surface roughness Ra is a centerline surface roughness in accordance with JIS-B-0651.

As a substrate layer, preferred is one comprising an acrylonitrile-butadiene-styrene copolymer type resin and/or a polystyrene type resin, one comprising a polyethylene terephthalate type resin and a polycarbonate type resin, or one comprising an imidated copolymer having an aromatic vinyl monomer residue and an unsaturated dicarboxylic acid imide derivative residue. Another component may be incorporated into the substrate layer within a range of not impairing the purpose of the present invention.

An electroconductive sheet comprising a substrate layer of a thermoplastic resin comprising an acrylonitrile-butadiene-styrene copolymer type resin and/or a polystyrene type resin and having laminated on at least one side of the substrate layer, an electroconductive resin composition comprising a polycarbonate type resin and from 5 to 50 wt % of carbon black, is one of preferred constitutions of the electroconductive sheet.

The acrylonitrile-butadiene-styrene copolymer type resin to be used in the present invention is one composed mainly of a copolymer consisting essentially of three components of acrylonitrile, butadiene and styrene, and a commercially available product may be used. For example, a copolymer obtained by block or graft polymerization of at least one monomer selected from an aromatic vinyl monomer and a vinyl cyanide monomer to a diene type rubber, or a blended product with said copolymer, may be mentioned. Said diene type rubber is a polymer obtained by polymerizing butadiene as a component, and examples of which include polybutadiene, polyisoprene, an acrylonitrile-butadiene copolymer and a styrene-butadiene copolymer. The aromatic vinyl monomer may, for example, be styrene, α-methylstyrene or an alkyl-substituted styrene. The vinyl cyanide monomer may, for example, be acrylonitrile, methacrylonitrile or a halogen-substituted acrylonitrile. Specific examples of the copolymer and the blended product with said copolymer include an acrylonitrile-butadiene-styrene terpolymer and one obtained by polymer-alloying a polybutadiene to an acrylonitrile-styrene bipolymer. Further, an acrylonitrile-styrene bipolymer containing no rubber component is also included.

The polystyrene type resin is a polymer obtained by polymerizing styrene as a component, and examples of which include one composed mainly of a polystyrene resin for general use or an impact resistant polystyrene resin, or a mixture thereof.

In a case where the substrate layer for the electroconductive sheet is made of at least one thermoplastic resin selected from the group consisting of an acrylonitrile-butadiene-styrene copolymer type resin and a polystyrene type resin, a polycarbonate type resin may further be incorporated in an amount of from 1 to 50 wt % based on the thermoplastic resin. By incorporating a polycarbonate type resin, the mechanical strength will further be improved. The amount of the polycarbonate type resin is preferably at most 50 wt % so as to obtain an electroconductive sheet at a low cost.

In a case where a polyethylene terephthalate type resin and a polycarbonate type resin are used for the substrate layer, the proportion of the polyethylene terephthalate type resin is preferably from 35 to 97 wt %, and the proportion of the polycarbonate type resin is preferably from 3 to 65 wt %, based on the total amount of the two components. In such a case, another component may be incorporated therein within a range of not impairing the purpose of the present invention.

As the polycarbonate type resin, one used for the electroconductive resin composition for the surface layer may be used. The resin for the substrate layer may be the same as or different from one used for the surface layer. Preferably, the polyethylene terephthalate type resin is from 35 to 97 wt %, and the polycarbonate type resin is from 3 to 65 wt %, and more preferably, the polyethylene terephthalate type resin is from 51 to 97 wt %, and the polycarbonate type resin is from 3 to 49 wt %, based on the total amount of the polyethylene terephthalate type resin and the polycarbonate type resin. The folding strength and the secondary processability of the electroconductive sheet will decrease if the compounding ratio of the polycarbonate type resin is too low or too high. The balance of the strength and the secondary processability will be excellent within the above-mentioned ranges.

The polyethylene terephthalate type resin may be one composed mainly of ethylene glycol and terephthalic acid or a dimethyl ester thereof. Further, one having a part thereof substituted with, diethylene glycol, 1,4-tetramethylene glycol, 1,4-cyclohexane dimethanol or heptanemethylene glycol in a case of a glycol component, or e.g. isophthalic acid, 1,5-naphthalene dicarboxylic acid or adipic acid in a case of a dicarboxylic acid component, as a copolymerizable monomer, may be used. Preferred is a polyethylene terephthalate type resin having from 0.1 to 10 mol % of a 1,4-cyclohexane dimethanol component as a glycol component copolymerized, or a polyethylene terephthalate type resin having from 1 to 10 mol % of an isophthalic acid component as an acidic component copolymerized, from the viewpoint of moldability.

More preferred is a polyethylene terephthalate type resin comprising a glycol component and from 1 to 10 mol % of a 1,4-cyclohexane dimethanol component copolymerized, since crystallization proceeds slowly, and the impact strength is high. With a copolymer with a higher molar ratio of the 1,4-cyclohexane dimethanol component, the crystallization proceeds extremely slowly, whereby there will be problems such as fusion and blocking in extrusion step, drying step or recycle step, or physical properties of a molded product tend to be deteriorated.

Further, one having an intrinsic viscosity [η] (hereinafter referred to as IV value) of from 0.6 to 1.0 dl/g is suitably used, as measured at 30° C. when the polyethylene terephthalate type resin is dissolved in a mixed solvent of 1,1,4, 4-tetrachloroethane with phenol (in a weight ratio of 60:40). If it is less than 0.6, the electroconductive sheet or the molded product tends to have insufficient mechanical strength and is likely to break, and if it exceeds 1.0 dl/g, the melt viscosity tends to be high, and extrudability tends to be poor, whereby the productivity will decrease. As the polyethylene terephthalate type resin, a commercially available product may be used.

For the substrate layer, an imidated copolymer having an aromatic vinyl monomer residue and an unsaturated dicarboxylic acid imide derivative residue may be used. In such a case, it is preferred that the substrate layer further contains an acrylonitrile-butadiene-styrene copolymer type resin in addition to the imidated copolymer.

The imidated copolymer is a copolymer having an aromatic vinyl monomer residue and an unsaturated dicarboxylic acid imide derivative residue, and one further having an unsaturated dicarboxylic anhydride residue may also be used. It may further contain a rubber-like polymer. With respect to the amount of each component, the rubber-like polymer is from 0 to 40 wt %, the aromatic vinyl monomer residue is from 30 to 70 wt %, the unsaturated dicarboxylic acid imide derivative residue is from 20 to 60 wt %, and the unsaturated dicarboxylic anhydride residue is from 0 to 15 wt %. Further, a copolymerizable vinyl residue may be used in an amount of from 0 to 40 wt %. As the imidated copolymer, a commercially available product may be used, such as "Malecca" trade name, sold by Denki Kagaku Kogyo K.K.

The acrylonitrile-butadiene-styrene copolymer type resin to be used in such a case is not particularly limited, and a commercially available product may be used. Particularly preferred is an acrylonitrile-butadiene-styrene copolymer type resin comprising from 5 to 93 wt % of a graft copolymer obtained by copolymerizing from 5 to 80 parts by weight of a rubber-like polymer with from 20 to 95 parts by weight of a monomer mixture comprising from 60 to 90 wt % of an aromatic vinyl monomer, from 10 to 40 wt % of a vinyl cyanide monomer and from 0 to 40 wt % of a vinyl monomer copolymerizable with the above monomers, and a resin composition comprising from 0 to 80 wt % of a vinyl copolymer comprising from 60 to 90 wt % of an aromatic vinyl monomer residue, from 10 to 40 wt % of a vinyl cyanide monomer residue and from 0 to 40 wt % of a vinyl monomer residue copolymerizable these with.

In a case of using an acrylonitrile-butadiene-styrene copolymer type resin together, the imidated copolymer may be used in an amount of from 5 to 93 wt % based on the total amount of the imidated copolymer and the acrylonitrile-butadiene-styrene copolymer type resin. If it is beyond this range, heat deterioration is likely to result during processing, or no adequate impact strength tends to be obtained.

Carbon black may be incorporated into the substrate layer of any composition, in a small amount so as not to impair the fluidity. By incorporating carbon black, the mechanical strength will further improve, and at the same time, such a problem can be overcome that the thickness of the electroconductive sheet tends to be thin when the electroconductive sheet is formed into a packaging container, whereby e.g. the corner portion of the packaging container may be transparent.

Carbon black to be incorporated in the substrate layer is not particularly limited, so long as it can be uniformly dispersed in the substrate resin. The amount of carbon black incorporated in the electroconductive substrate layer, may be within a range of not impairing the fluidity as mentioned above, and it is preferably from 0.1 to 10 wt % based on the thermoplastic resin.

Into the substrate layer of any composition, another known thermoplastic resin component such as a polyethylene resin or a polypropylene resin, an olefin type resin such as a copolymer of ethylene or propylene (such as an ethylene-ethylacrylate resin, an ethylene-vinyl acetate copolymer resin or an ethylene-α-olefin copolymer resin), or a polyester type resin such as a polyethylene terephthalate resin or a polybutylene terephthalate resin, may be incorporated as a modifier. Further, an additive such as a lubricant, a plasticizer or a processing aid may be incorporated as the case requires. Further, for the substrate layer, the edge or a missed roll of the electroconductive sheet to be generated during production of the electroconductive sheet, or a pulverized product of the molded product, may be recycled in an amount of from 5 to 50 wt %.

To prepare the electroconductive sheet of the present invention, firstly a part or whole of the starting materials for the electroconductive resin composition is kneaded and pelletized by means of a conventional method employing e.g. an extruder, and the obtained electroconductive resin composition is sheeted together with a thermoplastic resin composition to be an electroconductive substrate sheet by a conventional method employing e.g. an extruder.

With respect to kneading of the electroconductive resin composition, starting materials may be kneaded all at once or may be stepwisely kneaded in such a manner that, for example, carbon black and a half of the polycarbonate type resin are kneaded, and then the rest of the materials are added to the kneaded product, followed by kneading, and it is also possible to add the rest of the materials at the time of sheeting.

The electroconductive sheet can be prepared by a known method employing e.g. an extruder or a calendering machine. As a method for laminating the electroconductive resin composition on the substrate layer, the respective layers may be firstly formed into sheets or films by a separate extruder and then stepwisely laminated by e.g. a thermolaminating method, a dry laminating method or an extrusion laminating method. Otherwise, the electroconductive resin composition may be laminated on the preliminarily formed electroconductive substrate sheet, by e.g. extrusion coating. In order to prepare the electroconductive sheet at a lower cost, it is preferred to obtain a laminated electroconductive sheet all at once by e.g. a multilayer coextrusion method employing a feed block or a multimanifold die.

The method for bringing the surface roughness Ra to be from 0.6 to 4.0 μm is not particularly limited, but a method of incorporating an inorganic filler such as talc, calcium carbonate, mica or isinglass into the resin, a method of incorporating natural rubber or synthetic rubber, or a method of embossing the surface by an embossing roll, may be mentioned. The method of embossing the surface by an embossing roll has such advantages that the dynamic properties and fabrication properties of the electroconductive sheet will not be impaired, it can be widely applied to e.g. a vinyl chloride resin, a polycarbonate resin, a polystyrene resin or a polyethylene terephthalate resin, which is used as an electroconductive sheet for a carrier tape at the present time, and further, as a cover material, one which is conventionally used can be utilized as it is.

The entire thickness of the electroconductive sheet is preferably from 0.1 to 3.0 mm, and the thickness of the electroconductive resin composition layer is preferably from 2 to 80% of the entire thickness. If the entire thickness is less than 0.1 mm, the strength of the packaging container to be obtained by forming the electroconductive sheet tends to be inadequate, and if it exceeds 3.0 mm, forming such as pressure forming, vacuum forming or thermo-forming tends to be difficult. Further, if the thickness of the electroconductive resin composition layer is less than 2%, the surface resistivity of the packaging container obtained by forming such an electroconductive sheet tends to be so high that no adequate antistatic effects can be obtained, and it exceeds 80%, the processability in e.g. pressure-forming, vacuum-forming or thermoforming tends to be poor.

The electroconductive sheet of the present invention is useful as a packaging material for electronic parts such as IC or electronic parts using IC, and is used for injection-molded trays, vacuum-formed trays, magazines and carrier tapes, and it is particularly suitable for carrier tapes.

BEST MODE FOR CARRYING OUT THE INVENTION

Now, the present invention will be explained in further detail with reference to Examples. However, it should be understood that the present invention is by no means restricted to such specific Examples.

EXAMPLE 1

As an electroconductive resin composition, an electroconductive resin compound was obtained by preliminarily kneading a polycarbonate type resin (Panlight L-1225, manufactured by Teijin Chemicals Ltd.) and 12 wt % of KETJENBLACK EC (manufactured by LION-AKZO) based on the polycarbonate type resin, by means of a $\phi 50$ mm vented twin-screw extruder, followed by pelletizing. The electroconductive resin compound was laminated on each side of an acrylonitrile-butadiene-styrene copolymer type resin (Techno ABS YT-346, manufactured by Techno Polymer Co., Ltd.) as a thermoplastic resin for a substrate layer of an electroconductive sheet, by a feed block method using a $\phi 65$ mm extruder (L/D=28), a $\phi 40$ mm extruder (L/D=26) and a T-die having a width of 500 mm to obtain a three-layer electroconductive sheet having an entire thickness of 300 $\mu$m and a thickness of the electroconductive resin composition layer of 30 $\mu$m on each side.

EXAMPLE 2

As an electroconductive resin composition, an electroconductive resin compound was obtained by preliminarily kneading a polycarbonate type resin (Panlight L-1225, manufactured by Teijin Chemicals Ltd.) and 20 wt % of Denka Black granules (manufactured by Denki Kagaku Kogyo K.K.) based on the polycarbonate type resin, by a $\phi 50$ mm vented twin-screw extruder, followed by pelletizing. The above electroconductive resin compound was laminated on each side of a mixture comprising an acrylonitrile-butadiene-styrene copolymer type resin (Techno ABS YT-346, manufactured by Techno Polymer Co., Ltd.) and 5 wt % of a polycarbonate type resin (Panlight L-1225, manufactured by Teijin Chemicals Ltd.) added thereto, as a thermoplastic resin for a substrate layer of an electroconductive sheet, in the same manner as in Example 1 to obtain a three-layer electroconductive sheet having an entire thickness of 200 $\mu$m and a thickness of the electroconductive resin composition layer of 20 $\mu$m on each side.

EXAMPLE 3

An electroconductive resin compound was obtained in the same manner as in Example 1. The electroconductive resin compound was laminated on each side of a resin comprising an acrylonitrile-butadiene-styrene copolymer type resin (Techno ABS YT-346, manufactured by Techno Polymer Co., Ltd.) and 10 wt % of said electroconductive resin compound added thereto, as a resin for a substrate layer of an electroconductive sheet, by using a $\phi 65$ mm extruder (L/D=28), two $\phi 40$ mm extruders (L/D=26) and a multi-manifold die for three layers of three types, having a width of 650 mm to obtain a three-layer electroconductive sheet having an entire thickness of 500 $\mu$m and a thickness of the electroconductive resin composition layer of 40 $\mu$m on each side.

EXAMPLE 4

A three-layer electroconductive sheet was obtained in the same manner as in Example 3 except that a polystyrene type resin (Toyo Styrol E640N, manufactured by Toyo Styrene) was used as the resin for a substrate layer of an electroconductive sheet.

COMPARATIVE EXAMPLE 1

A three-layer electroconductive sheet was obtained in the same manner as in Example 1 except that an electroconductive resin compound obtained by preliminarily kneading 78 wt % of a polystyrene type resin (Toyo Styrol E640N, manufactured by Toyo Styrene), 10 wt % of a HDPE resin (Hyzex 5000H, manufactured by Mitsui Chemicals, Inc.) and 12 wt % of KETJENBLACK EC (manufactured by LION-AKZO) by a $\phi 50$ mm vented twin-screw extruder, followed by pelletizing, was used as the electroconductive resin composition.

COMPARATIVE EXAMPLE 2

A three-layer electroconductive sheet was obtained in the same manner as in Example 1 except that an electroconductive resin compound obtained by preliminarily kneading a polystyrene type resin (Toyo Styrol E640N, manufactured by Toyo Styrene) and 12 wt % of KETJENBLACK EC (manufactured by LION-AKZO) by a $\phi 50$ mm vented twin-screw extruder, followed by pelletizing, was used as the electroconductive resin composition and a polystyrene type resin (Toyo Styrol E640N, manufactured by Toyo Styrene) was used as the resin for a substrate layer of an electroconductive sheet.

The electroconductive sheets thus prepared were evaluated. The results are shown in Table 1.

TABLE 1

| | Surface resistivity ($\Omega$) | Tensile properties (flow direction/width direction) | | | | Falling off of carbon |
|---|---|---|---|---|---|---|
| | | Breaking extension (%) | Strength at break (MPa) | Strength at yield point (MPa) | Tensile modulus (MPa) | |
| Ex. 1 | $10^4$ | 12/11 | 42/41 | 48/49 | 1760/1718 | ⊙ |
| Ex. 2 | $10^4$ | 10/9 | 45/43 | 52/50 | 1852/1769 | ⊙ |
| Ex. 3 | $10^4$ | 12/12 | 43/43 | 50/50 | 1812/1750 | ⊙ |
| Ex. 4 | $10^4$ | 8/9 | 40/40 | 46/45 | 1720/1680 | ⊙ |
| Comp. Ex. 1 | $10^4$ | 99/23 | 32/20 | 39/38 | 1469/1453 | ○ |
| Comp. Ex. 2 | $10^4$ | 96/75 | 25/20 | 25/23 | 1666/1539 | X |

EXAMPLE 5

A three-layer electroconductive sheet was obtained in the same manner as in Example 1 except that embossing was applied on the surface of one side of the electroconductive sheet by means of a metal embossing roll having a surface roughness Ra of 3.2 μm.

EXAMPLE 6

A three-layer electroconductive sheet was obtained in the same manner as in Example 2 except that embossing was applied on the surface of one side of the electroconductive sheet by means of a metal embossing roll having a surface roughness Ra of 0.9 μm.

EXAMPLE 7

A three-layer electroconductive sheet was obtained in the same manner as in Example 3 except that embossing was applied on the surface of one side of the electroconductive sheet by means of a silicone rubber roll containing sand.

EXAMPLE 8

A three-layer electroconductive sheet was obtained in the same manner as in Example 4 except that embossing was applied on the surface of one side of the electroconductive sheet by means of a metal embossing roll having a surface roughness Ra of 1.9 μm.

COMPARATIVE EXAMPLE 3

A three-layer electroconductive sheet was obtained in the same manner as in Comparative Example 1, except that embossing was applied on the surface of each side of the electroconductive sheet by means of a metal embossing roll having a surface roughness Ra of 0.3 μm, so that the electroconductive sheet had high gloss on the surface of each side.

COMPARATIVE EXAMPLE 4

A three-layer electroconductive sheet was obtained in the same manner as in Comparative Example 2 except that embossing was applied on the surface of one side of the electroconductive sheet by means of a metal embossing roll having a surface roughness Ra of 6.7 μm. However, the surface of the electroconductive sheet had intense irregularities, and the appearance of the sheet was very poor.

The above electroconductive sheets thus prepared were evaluated. The results are shown in Table 2.

TABLE 2

| | Surface resistivity ($\Omega$) | Tensile properties (flow direction/width direction) | | | | Falling off of carbon | Surface roughness (μm) | Surface gloss | Image inspection propriety |
|---|---|---|---|---|---|---|---|---|---|
| | | Breaking extension (%) | Strength at break (MPa) | Strength at yield point (MPa) | Tensile modulus (MPa) | | | | |
| Ex. 5 | $10^4$ | 12/11 | 42/41 | 48/49 | 1760/1718 | ⊙ | 3.76 | 2 | ○ |
| Ex. 6 | $10^4$ | 10/9 | 45/43 | 52/50 | 1852/1769 | ⊙ | 0.67 | 21 | ○ |
| Ex. 7 | $10^4$ | 12/12 | 43/43 | 50/50 | 1812/1750 | ⊙ | 1.09 | 17 | ○ |
| Ex. 8 | $10^4$ | 8/9 | 40/40 | 46/45 | 1720/1680 | ⊙ | 2.11 | 5 | ○ |
| Comp. Ex. 3 | $10^4$ | 99/23 | 32/20 | 39/38 | 1469/1453 | ○ | 0.22 | 65 | X |
| Comp. Ex. 4 | $10^4$ | 96/75 | 25/20 | 25/23 | 1666/1539 | X | 4.55 | 1 | ○ |

EXAMPLE 9

A polycarbonate type resin (Panlight L-1225, manufactured by Teijin Chemicals Ltd.), and 12 wt % of carbon black (KETJENBLACK EC, manufactured by LION-AKZO) and 5 wt % of a graft resin (Modiper A-4400, manufactured by NOF Corporation, main chain: 70 wt %/side chain: 30 wt %), based on the polycarbonate type resin, were preliminarily kneaded by means of a φ50 mm vented twin-screw extruder, followed by pelletizing, to obtain a resin composition.

Said resin composition was sheeted by means of a φ65 mm extruder (L/D=28) and a T-die having a width of 500 mm to obtain an electroconductive sheet having an entire thickness of 300 μm.

EXAMPLE 10

A polycarbonate type resin (Panlight L-1225, manufactured by Teijin Chemicals Ltd.) and 12 wt % of carbon black (KETJENBLACK EC, manufactured by LION-AKZO) based on the polycarbonate type resin, were preliminarily kneaded by means of a φ50 mm vented twin-screw extruder, followed by pelletizing, to obtain a resin composition.

Said resin composition was sheeted by means of a φ65 mm extruder (L/D=28) and a T-die having a width of 500 mm to obtain an electroconductive sheet having an entire thickness of 300 μm.

EXAMPLE 11

Using the same resin composition as in Example 9 as a surface layer, and an acrylonitrile-butadiene-styrene copolymer type resin (Techno ABS YT-346, manufactured by Techno Polymer Co., Ltd.) as a resin for a substrate layer, the surface layer was laminated on each side of the substrate layer by means of a feed block method using a φ65 mm extruder (L/D=28), a φ40 mm extruder (L/D=26) and a T-die having a width of 500 mm to obtain a three-layer electroconductive sheet having an entire thickness of 300 μm and a thickness of the resin composition layer of 30 μm on each side.

EXAMPLE 12

A polycarbonate type resin (Panlight L-1225, manufactured by Teijin Chemicals Ltd.), and 20 wt % of acetylene black (Denka Black granules, manufactured by Denki Kagaku Kogyo K.K.) as carbon black and 10 wt % of a graft resin (Modiper A-4400, manufactured by NOF Corporation), based on the polycarbonate type resin, were preliminarily kneaded by a φ50 mm vented twin-screw extruder, followed by pelletizing, to obtain a resin composition. The above resin composition was laminated on each side of a mixture comprising an acrylonitrile-butadiene-styrene copolymer type resin (Techno ABS YT-346, manufactured by Techno Polymer Co., Ltd.) and 5 wt % of a polycarbonate type resin (Panlight L-1225, manufactured by Teijin Chemicals Ltd.) added thereto, as a resin for a substrate layer, by means of a φ65 mm extruder (L/D=28), two φ40 mm extruders (L/D=26) and a multimanifold die for three layers of three types having a width of 650 mm, to obtain a three-layer electroconductive sheet having an entire thickness of 500 μm and a thickness of the surface layer of the resin composition of 40 μm on each side.

The above electroconductive sheets thus prepared were evaluated. The results are shown in Table 3.

TABLE 3

| | Surface resistivity (Ω) | Tensile properties (flow direction/width direction) | | | | Dupont impact strength (J) | Falling off of carbon |
|---|---|---|---|---|---|---|---|
| | | Breaking extension (%) | Strength at break (MPa) | Strength at yield point (MPa) | Tensile modulus (MPa) | | |
| Ex. 9 | 10⁴ | 8/7 | 52/50 | 52/50 | 2035/2087 | 0.95 | ◎ |
| Ex. 10 | 10⁴ | 10/12 | 54/53 | 59/58 | 2200/2295 | 0.75 | ◎ |
| Ex. 11 | 10⁴ | 11/10 | 41/39 | 47/48 | 1710/1680 | 0.65 | ◎ |
| Ex. 12 | 10⁴ | 9/8 | 44/42 | 50/48 | 1780/1730 | 0.68 | ◎ |

Examples 9 and 10 are different from the viewpoint that a graft resin was used in Example 9, and it is evident that the Dupont impact strength increased by incorporation of the graft resin. Further, as evident from Examples 11 and 12, not only a monolayer electroconductive sheet but also a multilayer electroconductive sheet can be prepared by using the resin composition of the present invention.

EXAMPLE 13

As a material for a substrate layer, one obtained by blending a polyethylene terephthalate type resin (PET9921, manufactured by Eastman, IV value: 0.80) and a polycarbonate type resin (Panlight L-1250L, manufactured by Teijin Chemicals Ltd.) in a ratio as identified in Table 4, followed by stirring for mixing, was used. As a material for a surface layer, a resin comprising 100 parts by weight of a polycarbonate type resin (Panlight L-1225L, manufactured by Teijin Chemicals Ltd.) and 20 parts by weight of carbon black (Denka Black granules, manufactured by Denki Kagaku Kogyo K.K.) dispersed therein, was used. Each material was dried by a dehumidifier. Then, the material for a surface layer and the material for a substrate layer were simultaneously extruded by a 40 mm single-screw extruder and by a 65 mm single-screw extruder, respectively, at an extrusion temperature of from 260 to 300° C., and the respective molten resins were laminated by means of a feed block for three layers of two types (thickness slit ratio=1:8:1), extruded by a T-die having a width of 650 mm, and sheeted by a quenching roll to prepare a three-layer electroconductive sheet having a thickness of 0.30 mm and a thickness ratio of 1:8:1 (surface layer:substrate layer:surface layer).

EXAMPLES 14 AND 15 AND COMPARATIVE EXMAPLES 5 TO 7

A three-layer electroconductive sheet was prepared in the same manner as in Example 13 except that the composition was as identified in Table 4.

COMPARATIVE EXMAPLES 8

Using the same electroconductive resin for a surface layer as in Example 13, the resin was extruded by a φ65 mm single-screw extruder at an extrusion temperature of from 260 to 300° C. to prepare a monolayer electroconductive sheet.

EXAMPLES 16 AND 17 AND COMPARATIVE EXMAPLES 9 AND 10

A three-layer electroconductive sheet was prepared in the same manner as in Example 14 except that the thickness ratio of the sheet as identified in Table 4.

With respect to the electroconductive sheets obtained in Examples and Comparative Examples, the surface resistivity, the tensile properties, falling off of carbon, folding strength and impact strength were evaluated. Further, the electroconductive sheets of Examples and Comparative Examples were shaped into a carrier tape by a carrier tape shaping machine to evaluate secondary processability. The results are shown in Table 5.

TABLE 4

| | Examples | | | | | Comparative Examples | | | | | |
|---|---|---|---|---|---|---|---|---|---|---|---|
| | 13 | 14 | 15 | 16 | 17 | 5 | 6 | 7 | 8 | 9 | 10 |
| Substrate layer | | | | | | | | | | | |
| PC type resin | 60 | 40 | 20 | 40 | 40 | 0 | 100 | 80 | — | 40 | 40 |
| PET type resin | 40 | 60 | 80 | 60 | 60 | 100 | 0 | 20 | — | 60 | 60 |

TABLE 4-continued

|  | Examples | | | | | Comparative Examples | | | | | |
| --- | --- | --- | --- | --- | --- | --- | --- | --- | --- | --- | --- |
|  | 13 | 14 | 15 | 16 | 17 | 5 | 6 | 7 | 8 | 9 | 10 |
| Surface layer | | | | | | | | | | | |
| PC type resin | 100 | 100 | 100 | 100 | 100 | 100 | 100 | 100 | 100 | 100 | 100 |
| Thickness ratio of surface layer/substrate layer/surface layer | 1/8/1 | 1/8/1 | 1/8/1 | 1/18/1 | 1/6/1 | 1/8/1 | 1/8/1 | 1/8/1 | — | 3/1/3 | 1/100/1 |

TABLE 5

|  | | Examples | | | | | Comparative Examples | | | | | |
| --- | --- | --- | --- | --- | --- | --- | --- | --- | --- | --- | --- | --- |
|  | | 13 | 14 | 15 | 16 | 17 | 5 | 6 | 7 | 8 | 9 | 10 |
| Surface resistivity | Ω | $2.4 \times 10^4$ | $3.1 \times 10^4$ | $1.9 \times 10^4$ | $3.2 \times 10^4$ | $2.3 \times 10^4$ | $2.8 \times 10^4$ | $3.1 \times 10^4$ | $4.1 \times 10^4$ | $1.9 \times 10^4$ | $2.3 \times 10^4$ | $5.2 \times 10^{12}$ |
| Tensile properties | Breaking extension % | 118 | 136 | 195 | 156 | 89 | 301 | 71 | 75 | 13 | 28 | 169 |
|  | Strength at yield point MPa | 49 | 47 | 46 | 47 | 47 | 46 | 53 | 51 | 59 | 48 | 47 |
|  | Strength at break MPa | 62 | 55 | 49 | 55 | 55 | 47 | 60 | 56 | 55 | 56 | 54 |
|  | Tensile modulus MPa | 1566 | 1628 | 1629 | 1635 | 1631 | 1530 | 1520 | 1732 | 1641 | 1655 | 1590 |
| Falling off of carbon | — | ⊚ | ⊚ | ⊚ | ⊚ | ⊚ | ⊚ | ⊚ | ⊚ | ⊚ | ⊚ | ⊚ |
| Folding strength | Times | 251 | 384 | 1083 | 415 | 350 | 3020 | 21 | 38 | 15 | 27 | 430 |
| Impact strength | J | 0.7 | 0.6 | 0.5 | 0.7 | 0.6 | 1.1 | 0.5 | 0.8 | 0.9 | 0.8 | 0.6 |
| Secondary processability | — | ○ | ○ | ○ | ○ | ○ | X | Δ | ○ | X | Δ | ○ |

EXAMPLE 18

A polycarbonate type resin (Panlight L-1225, manufactured by Teijin Chemicals Ltd.) and 12 wt % of carbon black (KETJENBLACK EC, manufactured by LION-AKZO) based on the polycarbonate type resin were preliminarily kneaded by a ϕ50 mm vented twin-screw extruder, followed by pelletizing, to obtain an electroconductive resin compound. The electroconductive resin compound was laminated on each side of an imidated copolymer (Denka Malecca K-400, manufactured by Denki Kagaku Kogyo K.K.) as a resin for a substrate layer, by means of a feed block method using a ϕ65 mm extruder (L/D=28), a ϕ40 mm extruder (L/D=26) and a T-die having a width of 500 mm, to obtain a three-layer electroconductive sheet having an entire thickness of 300 μm and a thickness of the surface layer of 30 μm on each side.

EXAMPLE 19

A polycarbonate type resin (Panlight L-1225, manufactured by Teijin Chemicals Ltd.) and 20 wt % of carbon black (Denka Black granules, manufactured by Denki Kagaku Kogyo K.K.) based on the polycarbonate type resin were preliminarily kneaded by a ϕ50 mm vented twin-screw extruder, followed by pelletizing, to obtain an electroconductive resin compound. Using an imidated copolymer (Denka Malecca K-510, manufactured by Denki Kagaku Kogyo K.K.) as a resin for a substrate layer, a three-layer electroconductive sheet having an entire thickness of 200 μm and a thickness of the surface layer of 20 μm on each side was prepared in the same manner as in Example 18.

EXAMPLE 20

An electroconductive compound was obtained in the same manner as in Example 18. The electroconductive compound was laminated on each side of a resin comprising an imidated copolymer (Denka Malecca K-400, manufactured by Denki Kagaku Kogyo K.K.) and 10 wt % of the above electroconductive compound added thereto, as a resin for a substrate layer, by using of a ϕ65 mm extruder (L/D=28), two ϕ40 mm extruders (L/D=26) and a multimanifold die for three layers of three types having a width of 650 mm, to obtain a three-layer electroconductive sheet having an entire thickness of 500 μm and a thickness of the surface layer of 40 μm on each side.

EXAMPLE 21

A three-layer electroconductive sheet was obtained in the same manner as in Example 18 except that an imidated copolymer (Denka Malecca K-610, manufactured by Denki Kagaku Kogyo K.K.) was used as the resin for a substrate layer.

COMPARATIVE EXAMPLE 11

A three-layer electroconductive sheet was obtained in the same manner as in Example 18 except that an electroconductive resin compound obtained by preliminarily kneading a polystyrene resin (Toyo Styrol E640N, manufactured by Toyo Styrene), and 10 wt % of a polyethylene resin (Hyzex 5000H, manufactured by Mitsui Chemicals, Inc.) and 12 wt % of carbon black (KETJENBLACK EC, manufactured by LION-AKZO), based on the polystyrene resin, by a ϕ50 mm vented twin-screw extruder, followed by pelletizing, was used as the electroconductive resin composition, and an acrylonitrile-butadiene-styrene copolymer type resin (Techno ABS YT-346, manufactured by Techno Polymer Co., Ltd.) was used as the resin for a substrate layer.

COMPARATIVE EXAMPLE 12

A three-layer electroconductive sheet was obtained in the same manner as in Example 18 except that an electroconductive resin compound obtained by preliminarily kneading a polystyrene resin (Toyo Styrol E640N, manufactured by Toyo Styrene) and 12 wt % of carbon black (KETJENBLACK EC, manufactured by LION-AKZO)

based on the polystyrene resin, by a φ50 mm vented twin-screw extruder, followed by pelletizing, was used as the electroconductive resin composition, and a polystyrene resin (Toyo Styrol E640N, manufactured by Toyo Styrene) was used as the resin for a substrate layer.

The above electroconductive sheets thus prepared were subjected to the following evaluations.

TABLE 6

| | | | Tensile properties (flow direction/width direction) | | | |
|---|---|---|---|---|---|---|
| | Surface resistivity (Ω) | Breaking extension (%) | Strength at break (MPa) | Strength at yield point (MPa) | Tensile modulus (MPa) | Falling off of carbon |
| Ex. 18 | $10^4$ | 28/16 | 46/43 | 50/47 | 1903/1931 | ⊚ |
| Ex. 19 | $10^4$ | 22/14 | 41/40 | 43/42 | 1755/1647 | ⊚ |
| Ex. 20 | $10^4$ | 12/12 | 49/44 | 52/50 | 1951/1980 | ⊚ |
| Ex. 21 | $10^4$ | 17/11 | 42/38 | 44/42 | 1756/1620 | ⊚ |
| Comp. Ex. 11 | $10^4$ | 99/52 | 35/32 | 43/42 | 1536/1463 | ○ |
| Comp. Ex. 12 | $10^4$ | 95/89 | 21/20 | 20/19 | 1166/1139 | X |

The evaluation methods were as follows.

The physical properties were measured at 23° C. under a humidity of 50% unless otherwise specified. With respect to the folding strength and the impact strength, the evaluation results were in accordance with standards as an electroconductive sheet, which is commoner than a molded product.

Surface Resistivity

Using a Rolestar MCP tester manufactured by Mitsubishi Petrochemical Co., Ltd, the distance between terminals was set to be 10 mm, and the resistivity of the electroconductive sheet was measured at ten points at even intervals in a width direction in two lines on each side, i.e. at 40 points in total, whereupon the logarithmic mean value was taken as the surface resistivity.

Tensile Properties

In accordance with JIS-K-7127, tensile test was carried out by means of an Instron type tensile tester at a tension speed of 10 mm/min using a No. 4 test specimen, and the average of measured values in a flow direction and in a width direction was taken as the evaluation result.

Dupont Impact Strength

Using a Dupont impact tester (manufactured by TOYO SEIKI SEISAKU-SHO, LTD.), a bullet was made to fall on the electroconductive sheet to obtain a height at 50% break, and the energy value was calculated from the weight of the bullet at said height. The calculation was carried out in accordance with JIS-K-7211.

Evaluation of Falling Off of Carbon

The electroconductive sheet in a film form was formed into a carrier tape having a pocket with a size of 19 mm×25 mm, which was fixed on a shaking table. IC of QFP 14 mm×20 mm-64 pin was mounted in the pocket portion and vibrated at a speed of 480 reciprocations per minute with a stroke of 30 mm in a plane direction for 800,000 times, whereupon the presence or absence of depositions on the lead portion of IC was evaluated. The evaluation standards were ⊚: substantially no deposition observed, ○: some depositions observed, and X: many depositions observed.

Surface Roughness

The centerline surface roughness was measured by means of Surfcom 120A manufactured by TOKYO SEIMITSU CO., Ltd, in accordance with JIS-B-0651.

Surface Gloss

The gloss of the electroconductive sheet was measured at 5 points on each side by means of a gloss checker IG-301 manufactured by Horiba, Ltd. to obtain the average value on each side, and the lower value was taken as the gloss.

Image Inspection Propriety Test

The electroconductive sheet in a film form was formed into a carrier tape having a pocket with a size of 19 mm×25 mm. IC of QFP 14 mm×20 mm-100 pin was mounted in the pocket portion, whereupon the presence or absence of virtual image at the bottom of the pocket was confirmed by a CCD camera of 360,000 pixel. The evaluation standards were X: virtual image clearly confirmed, Δ: virtual image unclearly confirmed, and ○: no virtual image confirmed.

Folding Strength

In accordance with JIS-P-8116, sampling was carried out in a flow direction of the electroconductive sheet, and evaluation was carried out with a load of 500 g with a folding speed of 175 reciprocations per minute.

Secondary Processability

A carrier tape having a width of 24 mm was prepared from the electroconductive sheet by means of a carrier tape shaping machine (manufactured by EDG) to evaluate processability. The evaluation standards were ○: good, Δ: somewhat poor, and X: poor.

INDUSTRIAL APPLICABILITY

According to the present invention, an electroconductive sheet for packaging an electronic part, which substantially reduces staining of the electronic part due to abrasion of the electroconductive sheet with the electronic part, and which has adequate mechanical strength to endure packaging and mounting of an electronic part at a high speed, and a packaging container for an electronic part, are provided.

What is claimed is:

1. An electroconductive sheet, comprising:
   i) a substrate layer of a thermoplastic resin comprising at least one of an acrylonitrile-butadiene-styrene copolymer resin and a polystyrene resin;
   ii) and having laminated on at least one side of said substrate layer, a surface layer of an electroconductive resin composition comprising a polycarbonate resin, an acrylonitrile-butadiene-styrene copolymer resin, and from 5 to 50 wt % of carbon black.

2. An electroconductive sheet comprising:
   i) a substrate layer of a thermoplastic resin comprising at least one of an acrylonitrile-butadiene-styrene copolymer resin and a polystyrene resin;
   ii) and having laminated on at least one side of said substrate layer, a surface layer of an electroconductive resin composition comprising a polycarbonate resin, a polybutylene terephthalate resin, and from 5 to 50 wt % of carbon black, based on the total amount of resin.

3. The electroconductive sheet as claimed in claim 1, wherein said substrate layer further comprises from 1 to 50 wt % of a polycarbonate resin, based on the thermoplastic resin.

4. The electroconductive sheet as claimed in claim 2, wherein said substrate layer further comprises from 1 to 50 wt % of a polycarbonate resin, based on the thermoplastic resin.

5. The electroconductive sheet as claimed in claim 1, wherein said substrate layer further comprises from 0.1 to 10 wt % of carbon black, based on the total amount of resin.

6. The electroconductive sheet as claimed in claim 1, wherein said surface layer has a surface roughness from 0.6 μm to 4.0 μm.

7. The electroconductive sheet as claimed in claim 1, having a surface resisitivity of from $10^2$ to $10^{10}$ Ω on the side of said substrate layer on which said surface layer is laminated.

8. The electroconductive sheet as claimed in claim 1, which is produced by coextrusion.

9. An electroconductive sheet for packaging an electronic part, comprising the electroconductive sheet as claimed in claim 1.

10. A packaging container for an electronic part, comprising the electroconductive sheet for packaging an electronic part as claimed in claim 9.

11. A carrier tape comprising the electroconductive sheet for packaging an electronic part as claimed in claim 9.

12. An electroconductive sheet comprising a substrate layer of a thermoplastic resin comprising an acrylonitrile-butadiene-styrene copolymer resin and/or a polystyrene resin and having laminated on at least one side of the substrate layer, a surface layer of an electroconductive resin composition comprising a polycarbonate resin, a further resin component, and from 5 to 50 wt % of carbon black.

13. The electroconductive sheet according to claim 12, wherein the substrate layer further contains from 1 to 50 wt % of a polycarbonate resin based on the thermoplastic resin.

14. The electroconductive sheet according to claim 12, wherein the further resin component is an acrylonitrile-butadiene-styrene copolymer resin or a polybutylene terephthalate resin.

15. The electroconductive sheet according to claim 13, wherein the further resin component is an acrylonitrile-butadiene-styrene copolymer resin or a polybutylene terephthalate resin.

16. The electroconductive sheet as claimed in claim 1, wherein said substrate layer further comprises an ethylene-ethyl acrylate resin or an ethylene-vinyl acetate copolymer resin, as a modifier.

17. A packaging container for an electronic part, comprising the electroconductive sheet of claim 16.

18. A carrier tape comprising the electroconductive sheet of claim 16.

19. The electroconductive sheet as claimed in claim 2, wherein said substrate layer further comprises an ethylene-ethyl acrylate resin or an ethylene-vinyl acetate copolymer resin, as a modifier.

20. A packaging container for an electronic part, comprising the electroconductive sheet of claim 19.

21. A carrier tape comprising the electroconductive sheet of claim 19.

22. The electroconductive sheet according to claim 12, wherein said substrate layer further comprises an ethylene-ethyl acrylate resin or an ethylene-vinyl acetate copolymer resin.

23. A packaging container for an electronic part, comprising the electroconductive sheet of claim 22.

24. A carrier tape comprising the electroconductive sheet of claim 22.

* * * * *